United States Patent Office 2,917,498
Patented Dec. 15, 1959

2,917,498

COPOLYMERS AND METHOD OF PREPARATION THEREOF

Francis J. Honn, Westfield, N.J., assignor, by mesne assignments, to Minnesota Mining and Manufacturing Company, St. Paul, Minn., a corporation of Delaware No Drawing. Application October 27, 1954
Serial No. 465,136

9 Claims. (Cl. 260—87.5)

This invention relates to novel copolymers of fluorodienes with phenyltrifluoroethylene.

The synthetic rubber-like substances possess wide utility as a group serving not only as substitutes for natural rubber, but in some cases, the properties of the individual compositions are superior to the natural product, e.g., in oil resistance and aging characteristics.

In accordance with the present invention, copolymers of fluorodienes, which are preferably fluorinated butadienes, are produced by copolymerizing the fluorodiene with phenyltrifluoroethylene to produce copolymers which are useful as dielectric or insulating materials including dielectrics which are soft and rubbery and also those which are rigid and solid. The copolymers have satisfactory low temperature properties and very good high temperature properties. For example, a wire coated with these copolymers can be bent at relatively low temperatures without cracking the insulation, and at high operating temperatures the insulation does not drip off the wire. The combination of the presence of the aromatic ring and fluorine contributes to the desirability of these polymers for use at high temperatures. Other characteristics of these polymers which contribute to their use as insulating materials are their low moisture adsorption, noninflammability, resistance to strong and corrosive chemicals, good electrical properties, permanence, strength, and the fact that they are capable of being formed into various shapes by conventional molding techniques such as injection and extrusion techniques.

The copolymers of the invention have good resistance to aromatic and aliphatic hydrocarbon fuels as evidenced by the fact that volume swells in such fuels are considerably less than 100 percent. The copolymers may be cross-linked by conventional methods known to the art to enhance their oil and fuel resistance as well as the maximum temperatures at which they may be used.

The copolymers are also useful as protective coatings on metal, wood, and other hard surfaces which require protection from moisture, strong chemicals, ozone, microorganisms, and sunlight.

The fluorobutadienes which are preferably employed in the process of the invention to produce the desired copolymers have the formula

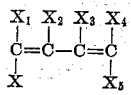

in which X and $X_1$ are identical and $X_4$ and $X_5$ are identical, and all are hydrogen or fluorine, $X_2$ and $X_3$ may be hydrogen, fluorine, or alkyl radicals preferably having from 1 to 3 carbon atoms, the compound containing at least 1 fluorine substituent, i.e., $X_2$ or $X_3$ must be fluorine, or one of the terminal carbon atoms must be difluorinated. Exemplary of the fluorobutadienes contemplated are 2-fluorobutadiene, 1,1-difluorobutadiene, 1,1 - difluoro - 3 - methyl butadiene, 1,1-difluoro-2-methyl butadiene, 1,1,2-trifluorobutadiene, 1,1,3-trifluorobutadiene, 1,1,3-trifluoro-2-methyl butadiene, 1,1,2,4,4-pentafluorobutadiene, and 1,1,2,4,4-pentafluoro-3-methyl butadiene. Also contemplated are the corresponding ethyl and propyl substituted butadienes in which ethyl and propyl groups may be substituted in the 2 and/or 3 positions, such as 2-fluoro-3-ethyl butadiene, 2-fluoro-3-propyl butadiene, and the like.

The copolymers of the invention may be prepared in various comonomer ratios, and by employing the various conventional polymerization recipes. Temperatures employed in the copolymerization reaction may be between about 0° C. and 100° C. with the preferred temperature range being between about 5 to 60° C. The copolymers of this invention are prepared by employing one of a number of free radical promoted polymerization systems. Peroxy type polymerization promoters have been found to be suitable in initiating the desired polymerization reactions and are used in suspension, emulsion, or mass polymerization systems.

Of the water suspension type catalyst systems which may be employed, a redox catalyst system is preferred, which comprises an oxidant and a reductant. The oxidant in the water suspension type recipe is preferably an inorganic persulfate, such as potassium persulfate, sodium persulfate, or ammonium persulfate. The reductant is preferably a bisulfite, such as potassium bisulfite, sodium bisulfite, potassium metabisulfite, or sodium metabisulfite. The oxidant in the suspension redox recipe comprises between about 0.1 and 5 parts by weight per 100 parts of total comonomers present, and preferably comprises between about 0.5 and 2 parts by weight per 100 parts of total comonomers present. The reductant, for example, sodium metabisulfite, may comprise between about 0.05 and about 5.0 parts by weight per 100 parts of total comonomers present and preferably comprises between about 0.1 and about 2 parts by weight per 100 parts of total comonomers present. A buffer such as sodium tetraborate may also be employed, if desired, together with the oxidant and reductant.

Also, about 0.01 to about 1 part by weight per 100 parts of total comonomers present of a variable valence metal salt may be employed. The variable valence metal salt is preferably an iron salt, such as ferrous sulfate or ferrous nitrate, and it is used as an activator. When producing the copolymers of the invention in the persulfate-bisulfite suspension system, it is preferable to operate at a temperature range of about 25° C. to about 60° C., but lower temperatures, i.e., between about 5° C. and 25° C., are desirably employed when a variable valence metal salt is present in the polymerization system. Also, the reductant and variable valence metal salt may be eliminated, if desired, and a water suspension recipe may be employed which contains only the oxidant.

Alternatively, an emulsion catalyst system, containing water, soap, and a peroxy compound, may also be employed. The different types of emulsion systems may be conveniently differentiated on the basis of the catalyst system employed to initiate the polymerization. One type is that in which the polymerization is initiated by employing a redox catalyst system, comprising between about 0.01 to about 1 part by weight per 100 parts of total comonomers present, of an organic oxidant and an activator solution. Exemplary of the organic oxidants which may be used in the emulsion catalyst system are cumene hydroperoxide, diisopropylbenzene hydroperoxide, triisopropylbenzene hydroperoxide, methylcyclohexane hydroperoxide, tertiary-butyl perbenzoate, and tertiary-butyl hydroperoxide. A typical activator solution may consist of about 0.01 to 1.0 part by weight per 100 parts of total comonomers present of a variable valence metal salt, for example, ferrous sulfate, about 0.1 to 10.0 parts by weight of sodium pyrophosphate, and about 0.1 to 10.0 parts by weight of a reducing sugar, such as dextrose, fructose, or levulose.

Another type of emulsion catalyst system is that which comprises about 0.05 to 5 parts by weight per 100 parts of total comonomers present of a persulfate as the oxidant, and which preferably comprises between about 0.1 and about 0.5 part by weight of any of the persulfates previously mentioned as being suitable for use in aqueous suspension systems.

The soap employed as the emulsifying agent in either the redox or persulfate emulsion catalyst systems is preferably a metal salt, such as the potassium or sodium salt, derived from saturated aliphatic acids, the optimum chain length of the acid being between about 14 and about 20 carbon atoms, or from polyfluorocarboxylic acids or perfluorochlorocarboxylic acids. The polyfluorocarboxylic acids which may be used are those disclosed in U.S. Patent No. 2,559,752, and the derivatives of the acids disclosed therein as being efficacious dispersing agents in polymerization reactions may also be employed in the process of the present invention. The perfluorochlorocarboxylic acids which may be used in the process of the present invention are those disclosed in copending application Serial No. 463,073, filed Oct. 18, 1954, now Patent No. 2,874,152, as being useful as dispersing agents in polymerization reactions. The soap is generally present in a quantity between about 0.5 and about 10 parts by weight per 100 parts of total comonomers present. The emulsion polymerization is desirably conducted under alkaline conditions, and the pH should be maintained between about 9 and 11 in order to prevent gelling of the soap. The pH may be adjusted, if desired, by the addition of suitable buffers.

Of the organic peroxide promoters which may be employed using the mass polymerization technique, substituted acetyl peroxides, such as trichloroacetyl peroxide, are preferred. Other suitable organic peroxides are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

The copolymers of this invention may be prepared at pressures ranging from atmospheric pressure to 1200 p.s.i.g. As a matter of convenience, the copolymers are prepared under autogenous conditions of pressure, i.e., about 50–250 p.s.i.g. The reaction time may be between about one hour and 100 hours, preferably about 5 to 75 hours.

Polymerization modifiers may also be employed to reduce the molecular weight of the copolymer products and thereby increase the solubility and ease of processing thereof. Exemplary of such modifiers are chloroform, carbon tetrachloride, trichloroacetyl chloride, bromotrichloromethane, and dodecyl mercaptan. These modifiers are generally added in quantities between about 0.1 to 10 parts by weight per 100 parts of total comonomers charged. Dodecyl mercaptan is the preferred modifier due to the unusual efficacy which it possesses for this purpose.

The invention will be further illustrated by reference to the following specific examples in which all parts are by weight:

Example 1

A charge was prepared according to the following recipe:

| | Parts by weight |
|---|---|
| Water, deionized | 200.0 |
| Monomers | 100.0 |
| Potassium persulfate | 1.0 |
| Sodium metabisulfite | 0.4 |
| Sodium tetraborate | 0.5 |
| Ammonium perfluorocaprylate (emulsifier) | 6.0 |
| t-Dodecyl mercaptan | 0.1 |

The polymerization tube was charged with the following ingredients, freezing the tube in a solid carbon dioxide-acetone bath after each addition:

(1) 20 parts of a water solution containing 0.4 part of sodium metabisulfite and 0.5 part of sodium tetraborate;
(2) 160 parts of a water solution containing 6 parts of ammonium perfluorocaprylate and 0.1 part of tertiary dodecyl mercaptan;
(3) 20 parts of a water solution containing 1.0 part of potassium persulfate;
(4) 56.4 parts of phenyltrifluoroethylene; and
(5) 43.6 parts of 1,1,3-trifluoro-2-methyl-1,3-butadiene.

The polymerization tube was sealed in vacuo at the temperature of liquid nitrogen and was then shaken in a water bath, the temperature of which was automatically controlled at 50° C. At the end of 24 hours the tube was frozen in a solid carbon dioxide-acetone bath, vented, and opened. The polymer was collected, washed several times with hot water, and dried to constant weight in a vacuum oven set at a temperature of 35° C. The product was a tough elastomer and was obtained in a quantity representing a 76 percent conversion, based upon the total weight of monomers charged. Analysis of the product showed it to contain 92.5 mole percent of combined phenyltrifluoroethylene and 7.5 mole percent of combined 1,1,3-trifluoro-2-methyl-1,3-butadiene.

A sample of the copolymer product was found to possess excellent molding properties when molded into sheets at a temperature of 200° F.

Example 2

A charge was prepared according to the recipe given in Example 1 above, and a polymerization tube was charged with an emulsion catalyst system having the same composition as that disclosed in Example 1 above, together with 60.6 parts of phenyltrifluoroethylene and 39.4 parts of 1,1-difluoro-3-methyl butadiene representing a total monomer charge containing 50 mole percent of each monomer. The polymerization was conducted for a period of 4 hours at a temperature of 50° C., following the general procedure of Example 1 above. The product was a very elastic copolymer obtained in a quantity representing a 53 percent conversion, based upon the total weight of monomers charged.

Example 3

The same recipe employed in Example 1 was used and a similar emulsion catalyst system was charged to a polymerization tube, together with 59.4 parts of phenyltrifluoroethylene and 40.6 parts of 1,1,2-trifluorobutadiene representing a total monomer charge containing 50 mole percent of each monomer. Polymerization was conducted at a temperature of 50° C. for 22 hours, following the general procedure of Example 1 above. A tough rubbery product was obtained containing 13 mole percent of combined phenyltrifluoroethylene and 87 mole percent of 1,1,2-trifluorobutadiene. The conversion was 69 percent, based upon the total weight of monomers charged.

A sample of the raw copolymer was molded at a temperature of 350° F. into a strong, flexible sheet, which had good low temperature flexibility, as evidenced by the Gehman stiffness data obtained for a sample of the copolymer:

$$T_{10} = -8° C.$$

(The value for $T_{10}$ is equal to the temperature at which the sample was 10 times as stiff as at a temperature of 25° C.)

Example 4

A polymerization tube was charged with an emulsion catalyst system having the same composition as that employed in Example 1 above, except that no tertiary-dodecyl mercaptan was used. The tube was then charged with 59.4 parts of phenyltrifluoroethylene and 40.6 parts of 1,1,3-trifluorobutadiene representing a total monomer charge containing 50 mole percent of each monomer. The polymerization was conducted at a temperature of 50° C. for a period of 24 hours following the general procedure of Example 1 above. A rubber copolymer was obtained in a quantity representing a 76 percent conversion, based upon the total weight of monomers charged, and by analysis was found to contain 55 mole percent of combined phenyltrifluoroethylene and 45 mole percent of combined 1,1,3-trifluorobutadiene.

*Example 5*

A polymerization tube was charged with an emulsion catalyst system having the same composition as that employed in Example 1 above, together with 68.8 parts of phenyltrifluoroethylene and 31.2 parts of 2-fluorobutadiene, representing a 50–50 molar charge of monomers. The polymerization was conducted at a temperature of 50° C. for a period of 24 hours following the general procedure of Example 1 above. The product was an elastomer containing 17.5 mole percent of combined phenyltrifluoroethylene and 82.5 mole percent of combined 2-fluorobutadiene. The conversion was 72 percent, based upon the total quantity of monomers charged.

The product showed excellent molding properties at a temperature of 350° F.

*Example 6*

A polymerization tube is charged with an emulsion catalyst system having the same composition as that employed in Example 1 above except that no tertiary-dodecyl mercaptan is used. The tube is then charged with 63.8 parts of phenyltrifluoroethylene and 36.2 parts of 1,1-difluorobutadiene representing a total monomer charge containing 50 mole percent of each monomer. The polymerization is conducted at a temperature of 50° C. for a period of 24 hours following the general procedure of Example 1 above. A copolymer product is obtained in a quantity representing about 60 percent conversion, based upon the total weight of monomers charged, and contains at least 20 mole percent of combined 1,1-difluorobutadiene.

*Example 7*

A polymerization tube is charged with an emulsion catalyst system having the same composition as that employed in Example 1 above except that no tertiary-dodecyl mercaptan is used. The tube is then charged with 52.4 parts of phenyltrifluoroethylene and 47.6 parts of 1,1,2,4,4-pentafluorobutadiene representing a total monomer charge containing 50 mole percent of each monomer. The polymerization is conducted at a temperature of 50° C. for a period of 24 hours following the general procedure of Example 1 above. The thermoplastic copolymer product is obtained in a quantity representing about a 40 percent conversion, based upon the total weight of monomers charged, and contains at least 15 mole percent of combined 1,1,2,4,4-pentafluorobutadiene.

It will be obvious to those skilled in the art that many modifications may be made within the scope of the present invention without departing from the spirit thereof, and the invention includes all such modifications.

I claim:
1. A copolymer of 13 to 92.5 mol percent phenyltrifluoroethylene and 87 to 7.5 mol percent of a fluorodiene containing hydrogen.
2. A copolymer of 13 to 92.5 mol percent phenyltrifluoroethylene and 87 to 7.5 mol percent of a fluorobutadiene containing hydrogen.
3. A copolymer of 13 to 92.5 mol percent phenyltrifluoroethylene and 87 to 7.5 mol percent of an alkyl substituted fluorobutadiene containing hydrogen.
4. A copolymer of 13 to 92.5 mol percent phenyltrifluoroethylene and 87 to 7.5 mol percent of a compound having the formula

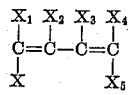

in which X and $X_1$ are identical and $X_4$ and $X_5$ are identical and all are selected from the group consisting of hydrogen and fluorine, and $X_2$ and $X_3$ are selected from the group consisting of hydrogen, fluorine, and alkyl radicals having 1 to 3 carbon atoms; the compound containing at least one fluorine and at least 1 hydrogen substituent.
5. A copolymer of 87 mol percent 1,1,2-trifluorobutadiene and 13 mol percent phenyltrifluoroethylene.
6. A copolymer of 45 mol percent 1,1,3-trifluorobutadiene and 55 mol percent phenyltrifluoroethylene.
7. A copolymer of 82.5 mol percent 2-fluorobutadiene and 17.5 mol percent phenyltrifluoroethylene.
8. A copolymer of 20 mol percent 1,1-difluorobutadiene and 80 mol percent phenyltrifluoroethylene.
9. A copolymer of 15 mol percent 1,1,2,4,4-pentafluorobutadiene and 85 mol percent phenyltrifluoroethylene.

References Cited in the file of this patent
UNITED STATES PATENTS

| | | |
|---|---|---|
| 2,647,110 | Wiseman | July 28, 1953 |
| 2,651,627 | Prober | Sept. 8, 1953 |
| 2,668,182 | Miller | Feb. 2, 1954 |
| 2,686,207 | Crane | Aug. 10, 1954 |
| 2,689,241 | Dittman et al. | Sept. 14, 1954 |
| 2,750,431 | Tarrant et al. | June 12, 1956 |
| 2,774,751 | Passino et al. | Dec. 18, 1956 |